J. C. KOPF.
MECHANICAL MOVEMENT.
APPLICATION FILED FEB. 19, 1920.

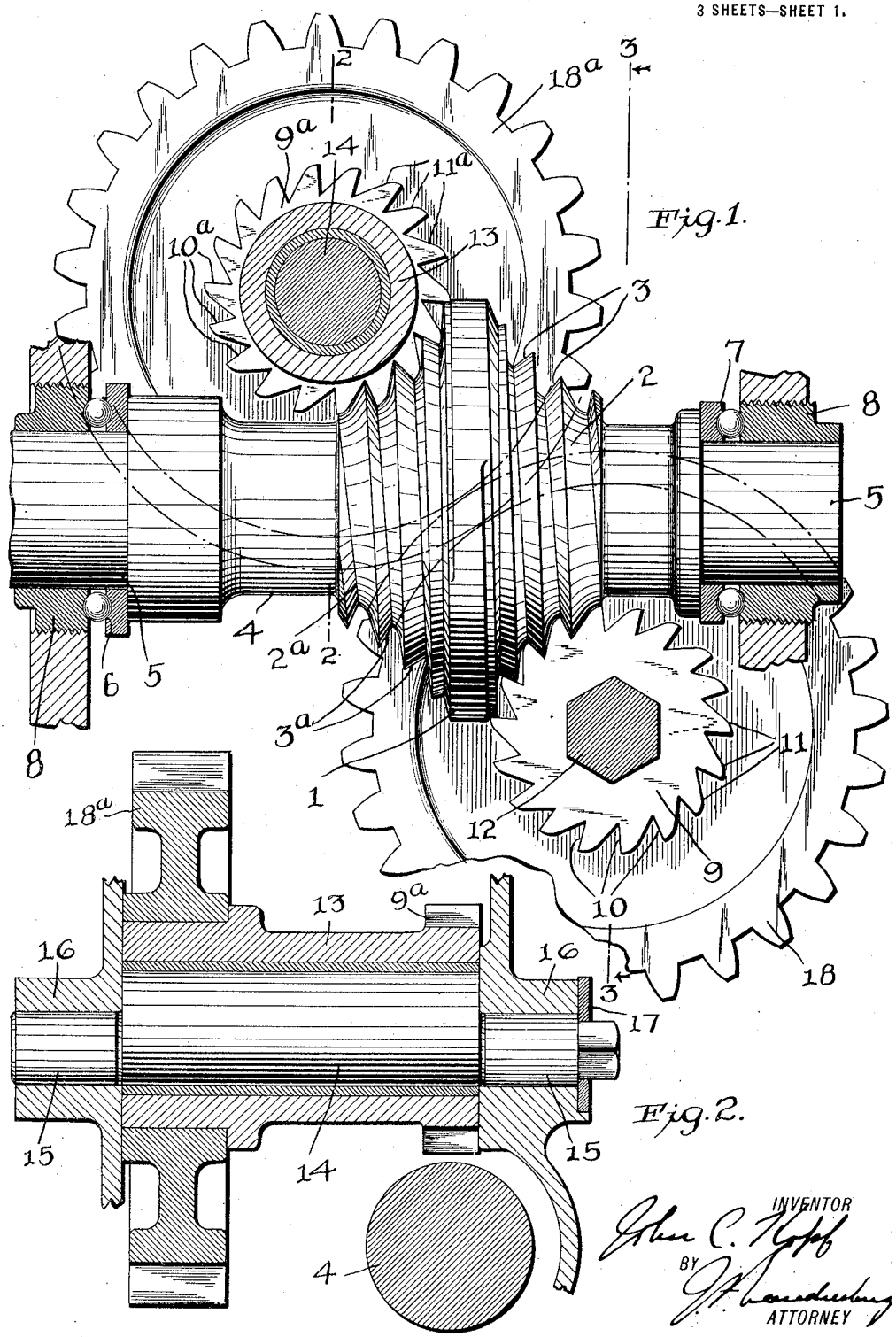

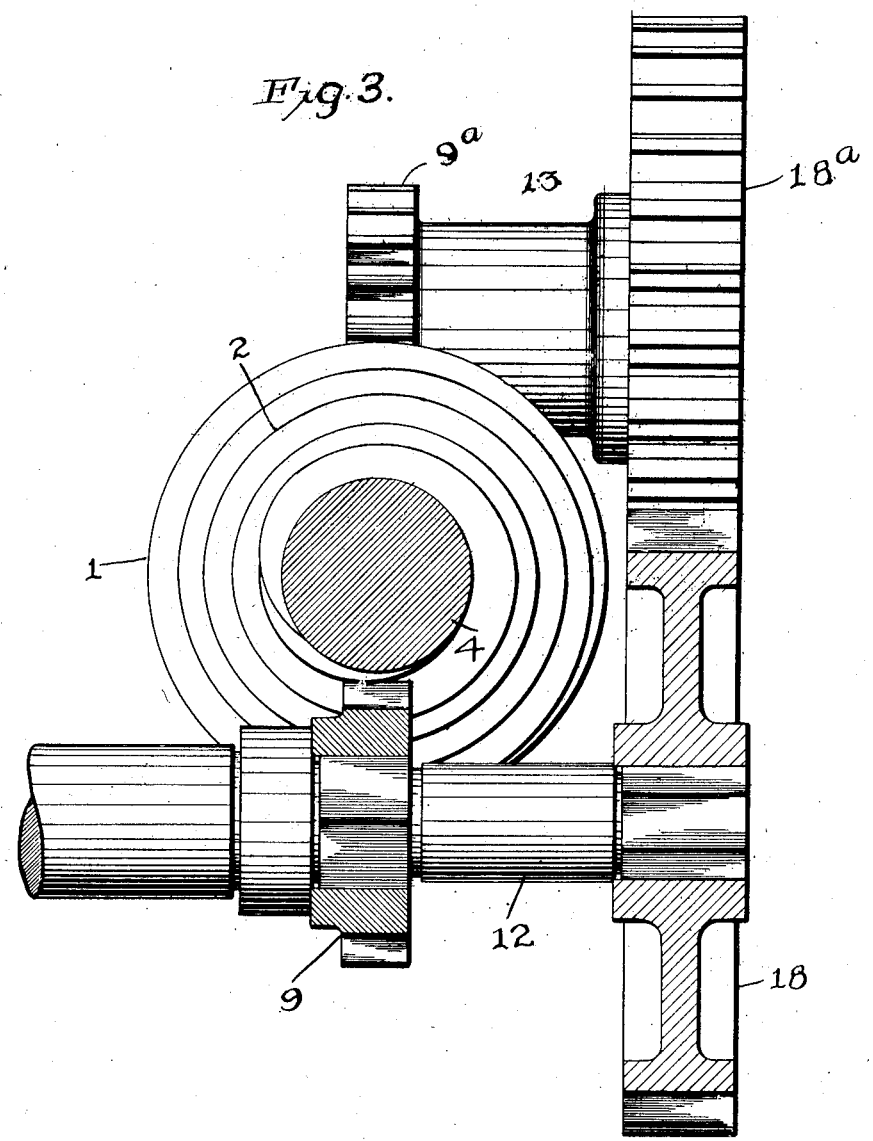

1,338,377.

Patented Apr. 27, 1920.
3 SHEETS—SHEET 3.

INVENTOR
BY
ATTORNEY

UNITED STATES PATENT OFFICE.

JOHN C. KOPF, OF BELLEVUE, PENNSYLVANIA.

MECHANICAL MOVEMENT.

1,338,377.  Specification of Letters Patent.  Patented Apr. 27, 1920.

Application filed February 19, 1920. Serial No. 359,871.

*To all whom it may concern:*

Be it known that I, JOHN C. KOPF, a citizen of the United States, and resident of the borough of Bellevue, in the county of Allegheny and State of Pennsylvania, have invented a new and useful Mechanical Movement, of which the following is a specification.

The invention is a spiral gearing, comprising elements designed to transmit power with high efficiency and comparatively little friction and each adapted for driving in one direction, combined and connected so as to be capable of driving in both directions, and provided with means for taking up play in respect to reverse sets of working faces. The driving element of the gearing consists of two concave conical spirals, reversely disposed and running helically in the same direction and spirally in opposite directions, the spirals being of buttress section to mesh with buttress teeth; two driven buttress-toothed gears mesh respectively with the spirals, wherewith they coöperate by sliding line contact; and means are provided for intergearing the buttress gears outside of the spirals and connecting them with a common part or train to be driven, such part being driven through the two spirals and buttress gears alternately as the direction of driving is reversed. By relatively adjusting the buttress gears so that their teeth where they engage the spirals are caused to bear against the reverse spiral working faces, play in both sides of the gearing is taken up.

In the accompanying drawings forming a part hereof:

Figure 1 is a sectional elevation;

Fig. 2 is a section on the line 2—2 of Fig. 1;

Fig. 3 is a section on the line 3—3 of Fig. 1;

Figure 4:
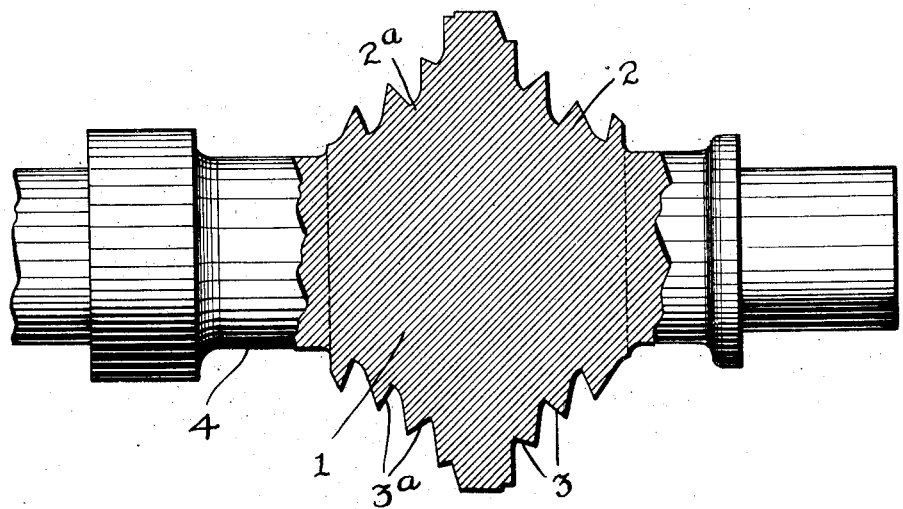
Fig. 4 is an axial section through the driving element.
Figure 5:
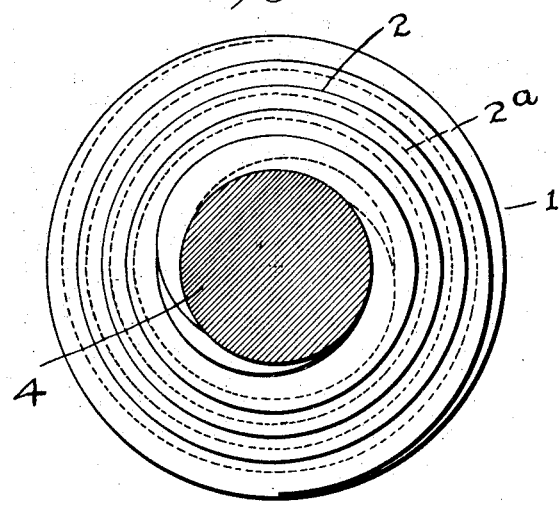
Fig. 5 is an end view thereof.

The driving part of the gearing comprises a double truncated conical concave body 1, the cones being reversely disposed, with their bases together, and tapering away from each other. The sides of said body are cut with threads 2, $2^a$, which progress both spirally and helically, the spiral and helical pitches being both constantly varying, as is also the angle of the working faces 3, $3^a$. This member is mounted and revolved in a suitable manner, 4 representing a driving shaft, 5 journal portions turning in bearings 6, and 7 end thrust-bearings having axially adjustable abutments 8.

The spirals 2 mesh respectively with toothed gear wheels 9, $9^a$, located diagonally at opposite sides of the driving axis and in a plane therewith. The teeth of these gears are of buttress shape, that is to say triangular, with abrupt or approximately radial working faces 10, $10^a$ and sloping backs 11, $11^a$; and the threads of the spirals are of buttress section to mesh with such teeth. As an incident to the manner in which the spirals are cut, the working faces 3, $3^a$ in the outer convolutions may be narrowed by the elimination of the undercut which would otherwise be present at these regions, but this is immaterial as far as the operation is concerned. Each spiral is formed with a plurality of convolutions, adapted to engage with a series of teeth of the corresponding gear wheel, the engagement extending over the major portion of what may be termed the lower forward quadrant of the circle of the gear; in other words, the spiral and teeth are in engagement from a point slightly beyond the point on the gear circle which is nearest the axis of rotation of the spiral, nearly to the "horizontal," 90° distant from such point.

It will be noted that the two spirals run in the same direction helically but in opposite directions spirally. Each spiral has a single working face 3 or $3^a$, the faces in the two spirals being reversely arranged, each acting from the end toward the central basal portion and from the axis outward. Each spiral and its gear wheel are adapted for efficient power transmission in one direction, thrust being exerted on the teeth inwardly toward the transverse central plane and outwardly from the axis; and, owing to the directions of the spirals, only one couple is engaged in driving at a time. Thus, when the spirals are turned in one direction, the working face 3 of the spiral 2 bears with sliding line contact on the working faces 10 of the gear wheel 9, driving the latter, while the working face $3^a$ of the other spiral is backing away from the working faces $10^a$ of the wheel $9^a$. Conversely, when the driving member is revolved in the opposite direction, the spiral $2^a$ drives the wheel $9^a$, while the working faces 3 and 10 are inactive.

The buttress gears which are thus alternately driven by their spirals are intergeared for synchronous movement by a pair of ordinary toothed gears 18, $18^a$ secured coaxially with the buttress gears and meshing at one side of the double spiral. The shaft 12 on which the gears 9 and 18 are fixed is journaled in suitable bearings (not shown), and its projecting broken-off portion is representative of the part, train or mechanism which is to be driven, alternately or at different times in opposite directions.

The gears $9^a$ and $18^a$ are fixed on a sleeve or hollow shaft 13, which turns upon a stationary shaft 14. Said shaft has eccentric end journals 15, which can be turned by degrees within bearing openings in suitable supports 16, in order slightly to displace the shaft and therefore the gear $9^a$. One of the extremities 19 of the adjusting shaft can be made polygonal to facilitate adjustment and to coöperate with an adjustment-holding plate 17. Thus by a turning movement the gear $9^a$ can be adjusted, so as to bring the working faces of the driven gears into closer opposite bearing relation to the working faces of the spirals, the effect being the same as if both gears 9 and $9^a$ were shifted, which could, of course, be done. In the particular construction illustrated the end thrust bearing abutments 8 of the double spiral member are loosened, the shaft 14 is adjusted so as to displace the gear $9^a$ in a direction more or less tangent to its arc of engagement with the spiral, and therefore in part at least lengthwise of the axis of rotation of the spirals; this pulls upon spiral member through the faces $10^a$ and $3^a$, shifting the spirals endwise and causing the other spiral working face 3 to approach the working faces 10 of the teeth of the segment 9. The play at both sides can thus be taken up partially or entirely as desired.

In operation, when the driving shaft is turned in one direction, one of the driving spirals travels uphill while the other travels downhill, and vice-versa when the movement of the driving shaft is reversed. In the one case, one of the buttress gears 9 or $9^a$ is driven by its spiral, while the other is not, its spiral turning idly and the gear being turned by virtue of the inter-gearing 18, $18^a$. When the drive is in the opposite direction this condition is reversed. In either case the shaft 12 is positively operated, first through one-half of the spiral gearing and then through the other. The mode of adjustment has already been described.

In cases where limited movements are to be produced the gears 9, $9^a$ and 18, $18^a$ can be segments. Numerous other changes can be made without departing from essentials.

What I claim as new is:

1. A mechanical movement comprising a driving member having two reversely-disposed concave conical spirals running helically in the same direction and spirally in opposite directions, a pair of toothed gears meshing respectively with said spirals, means intergearing said gears, and means for relative adjustment of the same to bring them into closer opposite bearing relation with the spirals.

2. A gearing comprising a driving part having two reversely disposed concave conical spirals of buttress section running helically in the same direction and spirally in opposite directions, two buttress-toothed gears meshing with said spirals, and means intergearing said gears outside of the spirals.

3. A gearing comprising a driving part having two reversely disposed concave conical spirals of buttress section running helically in the same direction and spirally in opposite directions, two buttress-toothed gears meshing with said spirals, means intergearing said gears outside of the spirals, and means of relative adjustment of the gears to take up play at both sides between the working faces of the gears and the reversed working faces of the spirals.

4. A mechanical movement comprising a double concave conical body having its conical sides base to base and tapering oppositely and formed with driving spirals of buttress section running helically in the same direction and spirally in opposite directions, a pair of buttress-toothed gears meshing with said spirals at diagonally opposite sides of the driving axis, and means intergearing said gears outside of the spirals.

5. A mechanical movement comprising a double concave conical body having its conical sides base to base and tapering oppositely and formed with driving spirals of buttress section running helically in the same direction and spirally in opposite directions, a pair of buttress-toothed gears meshing with said spirals at diagonally opposite sides of the driving axis, means intergearing said gears outside of the spirals, and means of relative adjustment of said gears in respect to the working faces of the spirals.

6. A mechanical movement comprising two reversely disposed concave conical driving spirals united on a common axis, said spirals being of buttress section and running helically in the same direction and spirally in opposite directions and having their working faces reversed with respect to each other, a pair of buttress-toothed gears meshing with said spirals to be driven alternately thereby, and means intergearing said gears outside of the spirals.

7. A gearing comprising an axially movable driving member having reversely disposed concave conical spirals running helically in the same direction and spirally in opposite directions, adjustable end bearings for said member, a pair of toothed gears meshing with said spirals, and means of relative adjustment between the gears affecting the longitudinal position of the driving member.

8. A gearing comprising an axially movable driving member having reversely disposed concave conical spirals running helically in the same direction and spirally in opposite directions, a pair of toothed gears meshing with said spirals, and means for adjusting one of the gears by a turning movement to take up play between both gears and their spirals.

9. A double concave conical gear member having driving spirals formed upon its reversely disposed conical sides, said spirals running helically in the same direction and spirally in opposite directions with constantly varying pitches, and being of buttress section with their working faces constantly varying in angle, reversed with respect to each other.

JOHN C. KOPF.